United States Patent
Johnson

(10) Patent No.: US 8,952,311 B2
(45) Date of Patent: Feb. 10, 2015

(54) IMAGING SYSTEMS WITH COLUMN CURRENT MIRROR CIRCUITRY

(75) Inventor: Richard Scott Johnson, Boise, ID (US)

(73) Assignee: Aptina Imaging Corporation, George Town (KY)

( * ) Notice: Subject to any disclaimer, the term of this patent is extended or adjusted under 35 U.S.C. 154(b) by 290 days.

(21) Appl. No.: 13/454,745

(22) Filed: Apr. 24, 2012

(65) Prior Publication Data

US 2013/0020467 A1   Jan. 24, 2013

Related U.S. Application Data

(60) Provisional application No. 61/510,978, filed on Jul. 22, 2011.

(51) Int. Cl.
*H01L 27/00* (2006.01)
*H04N 5/365* (2011.01)
*H04N 5/367* (2011.01)
*H04N 5/374* (2011.01)

(52) U.S. Cl.
CPC ............. *H04N 5/3658* (2013.01); *H04N 5/367* (2013.01); *H04N 5/3742* (2013.01)
USPC ..................................................... 250/208.1

(58) Field of Classification Search
CPC .... H04N 5/3658; H04N 5/3742; H04N 5/378
USPC ..................................................... 250/208.1
See application file for complete search history.

(56) References Cited

U.S. PATENT DOCUMENTS

| | | | |
|---|---|---|---|
| 4,565,959 A | 1/1986 | Nagano | |
| 6,064,267 A * | 5/2000 | Lewyn | 330/288 |
| 6,741,195 B1 | 5/2004 | Cho | |
| 6,828,856 B2 * | 12/2004 | Sanchez et al. | 330/253 |
| 7,238,925 B2 | 7/2007 | Purcell et al. | |
| 7,466,198 B1 * | 12/2008 | Hunter | 330/253 |
| 7,541,872 B2 * | 6/2009 | Oberhuber | 330/261 |
| 7,800,676 B2 | 9/2010 | Mentzer | |
| 2006/0125940 A1 | 6/2006 | Tinkler | |
| 2008/0239105 A1 | 10/2008 | Xu | |
| 2012/0194715 A1 * | 8/2012 | Skaug | 348/300 |

FOREIGN PATENT DOCUMENTS

| | | |
|---|---|---|
| EP | 1326428 | 7/2003 |
| JP | 2009213012 | 9/2009 |

OTHER PUBLICATIONS

Gonthier, "RTS Noise Impact in CMOS Image Sensors Readout Circuit", International Conference on Electronics, Circuits, and Systems, 2009, pp. 928-931. ISBN 978-1-4244-5090-9.

* cited by examiner

*Primary Examiner* — Thanh Luu
(74) *Attorney, Agent, or Firm* — Treyz Law Group; Louis R. Levenson; Michael H. Lyons

(57) ABSTRACT

Electronic devices may include image sensors having image pixel arrays with image pixels arranged in pixel rows and pixel columns. Each pixel column may be coupled to an active and an inactive current supply circuit. Each active current supply circuit may form a portion of a current mirror circuit that includes a common current source and a common input transistor. Each active current supply circuit may include a mirror transistor for mirroring current that flows through the common input transistor and a permanently enabled enabling transistor for activating that mirror transistor. Mirrored current that flows through a particular active mirror transistor may be supplied to image pixels in the pixel column associated with that particular mirror transistor. Each inactive current supply circuit may include a mirror transistor coupled to the input transistor and a permanently disabled enabling transistor.

7 Claims, 4 Drawing Sheets

IMAGING SYSTEMS WITH COLUMN CURRENT MIRROR CIRCUITRY

This application claims the benefit of provisional patent application No. 61/510,978, filed Jul. 22, 2011, which is hereby incorporated by reference herein in its entirety.

BACKGROUND

This relates generally to imaging devices, and more particularly, to imaging devices with column circuitry.

Image sensors are commonly used in electronic devices such as cellular telephones, cameras, and computers to capture images. In a typical arrangement, an electronic device is provided with an array of image pixels arranged in pixel rows and pixel columns. Circuitry is commonly coupled to each pixel column for reading out image signals from the image pixels and supplying bias signals to the image pixels. The readout circuitry sometimes includes a current mirror circuit.

In some situations, image signals from a pixel array can exhibit noise such as fixed pattern noise related to the operation of current mirror circuits on one or more pixel columns. This type of fixed pattern noise can reduce the quality of captured image data and may reduce the percentage yield of viable image sensors in situations in which image sensors are being produced in large numbers.

It would therefore be desirable to be able to provide imaging devices with improved column circuitry.

DETAILED DESCRIPTION

Electronic devices such as digital cameras, computers, cellular telephones, and other electronic devices include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
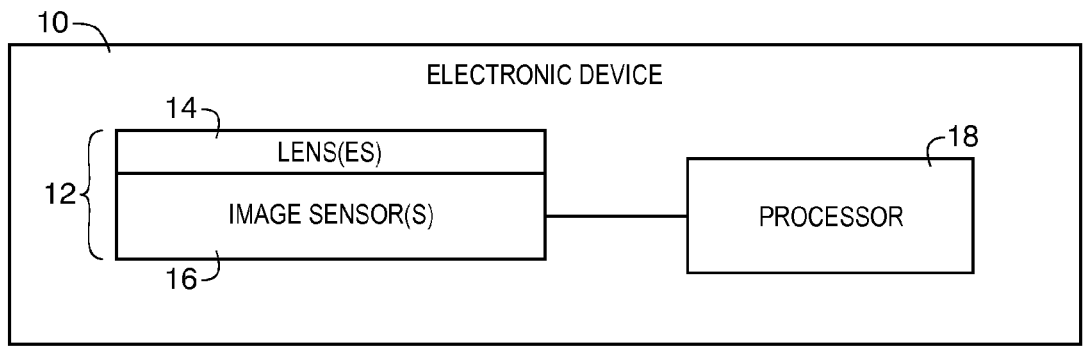
FIG. 1 is a diagram of an illustrative electronic device in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Camera module 12 may be used to convert incoming light into digital image data. Camera module 12 may include one or more lenses 14 and one or more corresponding image sensors 16. During image capture operations, light from a scene may be focused onto image sensor 16 by lens 14. Image sensor 16 provides corresponding digital image data to processing circuitry 18. If desired, camera module 12 may be provided with an array of lenses 14 and an array of corresponding image sensors 16.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18.

Figure 2:
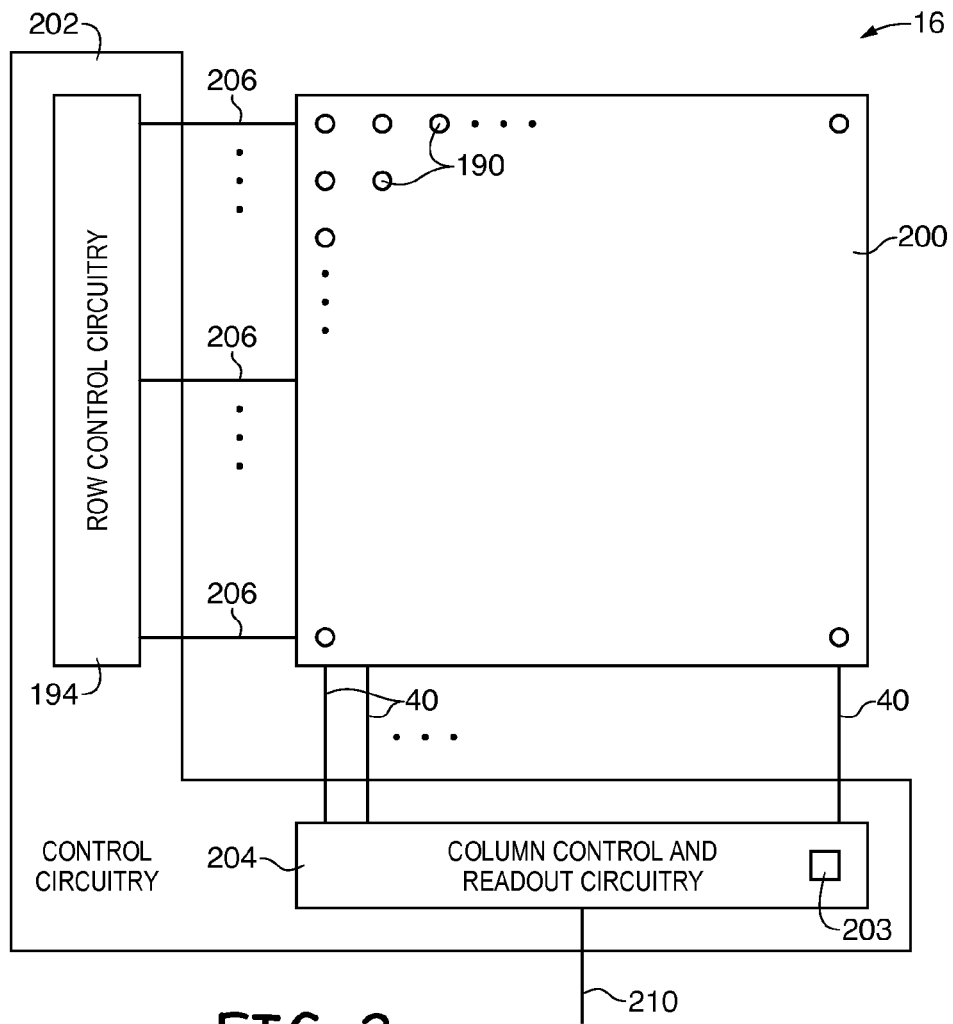
FIG. 2 is a diagram of an illustrative pixel array and associated control circuitry for generating control signals and bias signals and reading out pixel data in an image sensor in accordance with an embodiment of the present invention.

As shown in FIG. 2, image sensor 16 may include a pixel array 200 containing image sensor pixels 190 and control circuitry 202. Array 200 may contain, for example, hundreds or thousands of rows and columns of image sensor pixels 190. Control circuitry 202 may include row control circuitry 194 and column circuitry such as column control and readout circuitry 204. Row control circuitry 194 may be used to supply control signals such as reset, transfer, and read control signals to pixels 190 over control paths 206. One or more conductive lines such as column lines 40 may be coupled to each column of pixels 190 in array 200. Column lines 40 may be used for reading out image signals from pixels 190 and for supplying bias signals (e.g., bias currents or bias voltages) to pixels 190. During pixel readout operations, a pixel row in array 200 may be selected by row control circuitry 194 and image data associated with image pixels 190 in that pixel row can be read out along column lines 40.

Column circuitry such as column control and readout circuitry 204 may be coupled to pixels 190 using column lines 40. Column circuitry 204 may include sample-and-hold circuitry, amplifier circuitry, analog-to-digital conversion circuitry, bias circuitry such as pixel column bias supply circuits (e.g., circuitry such as current mirror circuitry for providing bias currents to source follower transistors of pixels 190 along a pixel column), memory or other circuitry for operating pixels 190 and for reading out image signals from pixels 190. Column circuitry 204 may include programmable memory such as one-time programmable memory (OTPM) 203. OTPM 203 may be programmed during manufacturing of device 10 based on testing performed on image sensor 16. OTPM 203 may be programmed, for example, to activate some portions of column current supply circuitry that is coupled to a column line while deactivating other portions of column current supply circuitry that is coupled to a column line.

Column circuitry 204 may include one or more sets of current supply circuitry (sometimes referred to herein as current supply circuits) associated with each column of pixels. For example, each column line 40 may be coupled to two current supply circuits each of which forms a portion of a current mirror circuit. Current supply circuits on each column line 40 may be coupled in parallel to that column line. Each current supply circuit may include one or more transistors coupled to an associated column line 40. Current supply circuits on column lines 40 may be coupled to a common current source through an additional transistor such as an input transistor of a current mirror circuit. Each current supply circuit may include a transistor operable to activate or inactivate that current supply circuit. Activated current supply circuits may form, together with the input transistor, a current mirror circuit for supplying a bias current to pixels 190. Column current mirror circuitry may, as an example, be used to provide a bias current to source follower transistors of each pixel 190.

During manufacturing of device 10, image sensor 16 may be programmed (e.g., by programming OTPM 203) to always use a selected one of several current supply circuits on each column line for supplying bias currents to the pixels on that column line.

Readout circuitry associated with column control and readout circuitry 204 (e.g., sample-and-hold circuitry and analog-to-digital conversion circuitry) may be used to supply digital image data to processor 18 (FIG. 1) over path 210.

Figure 3:
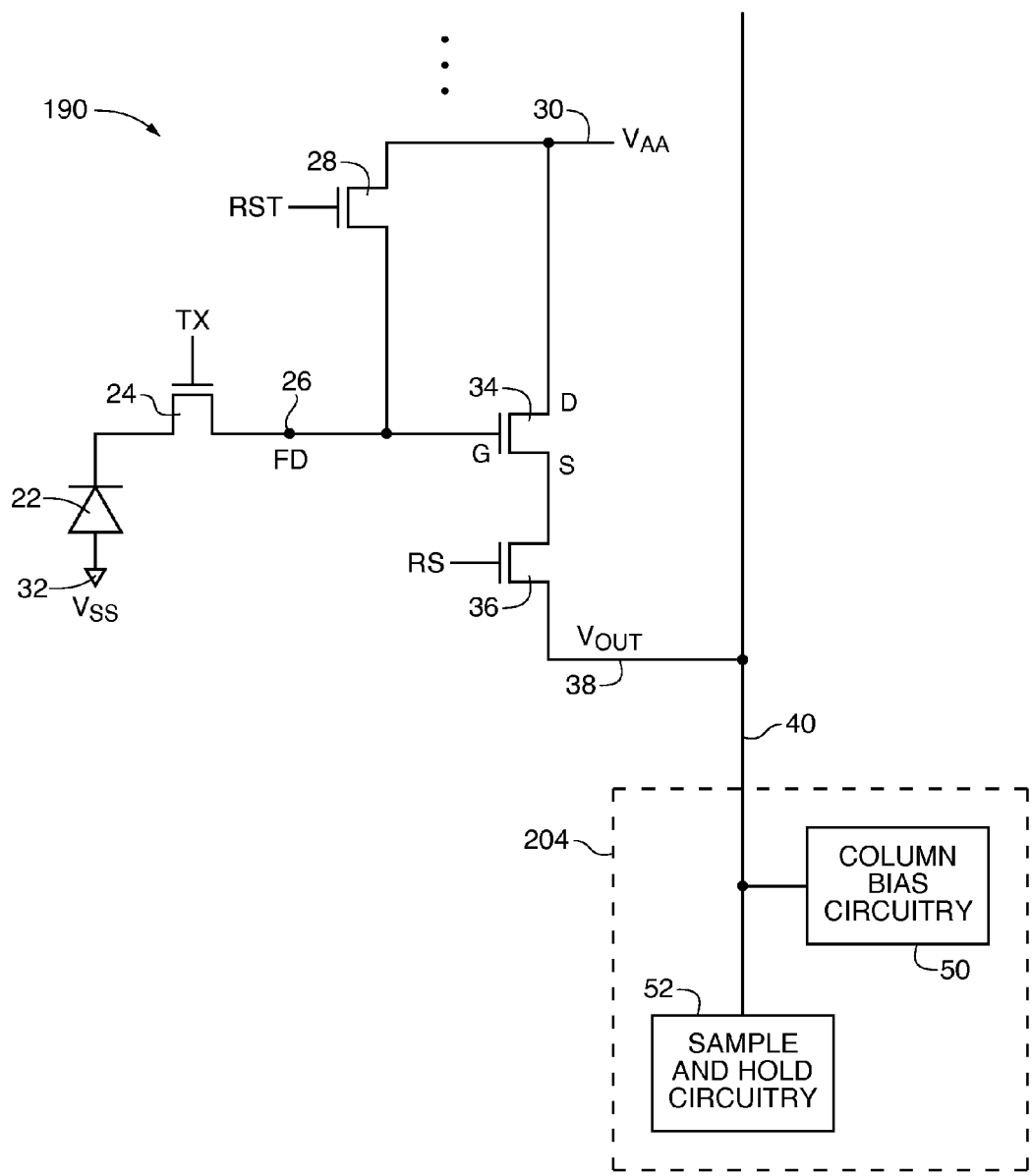
FIG. 3 is a diagram of an illustrative image sensor pixel in accordance with an embodiment of the present invention.

Circuitry in an illustrative pixel of one image sensors 16 is shown in FIG. 3. As shown in FIG. 3, pixel 190 includes a photosensitive element such as photodiode 22. A positive power supply voltage (e.g., voltage Vaa) may be supplied at positive power supply terminal 30. A ground power supply voltage (e.g., Vss) may be supplied at ground terminal 32. Incoming light may be collected by a photosensitive element such as photodiode 22 after passing through a color filter structure. Photodiode 22 converts the light to electrical charge.

Before an image is acquired, reset control signal RST may be asserted. This turns on reset transistor 28 and resets charge storage node 26 (also referred to as floating diffusion FD) to Vaa. The reset control signal RST may then be deasserted to turn off reset transistor 28. After the reset process is complete, transfer gate control signal TX may be asserted to turn on transfer transistor (transfer gate) 24. When transfer transistor 24 is turned on, the charge that has been generated by photodiode 22 in response to incoming light is transferred to charge storage node 26. Charge storage node 26 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiode 22. The signal associated with the stored charge on node 26 is conveyed to row select transistor 36 by source-follower transistor 34.

When it is desired to read out the value of the stored charge (i.e., the value of the stored charge that is represented by the signal at the source S of transistor 34), row select control signal RS can be asserted. When signal RS is asserted, transistor 36 turns on and a corresponding signal Vout that is representative of the magnitude of the charge on charge storage node 26 is produced on output path 38. In a typical configuration, there are numerous rows and columns of pixels such as pixel 190 in array 200. When signal RS is asserted in a given row, a path such as path 40 can be used to route signal Vout from that row to readout circuitry such as column control and readout circuitry 204.

Column control and readout circuitry 204 that is coupled to pixels 190 along column lines 40 may include readout circuitry such as sample and hold circuitry 52 for reading out image signals from pixels 190 and column bias circuitry 50 for providing column bias currents to, for example, source follower transistors 34 of pixels 190 along that column line.

Figure 4:
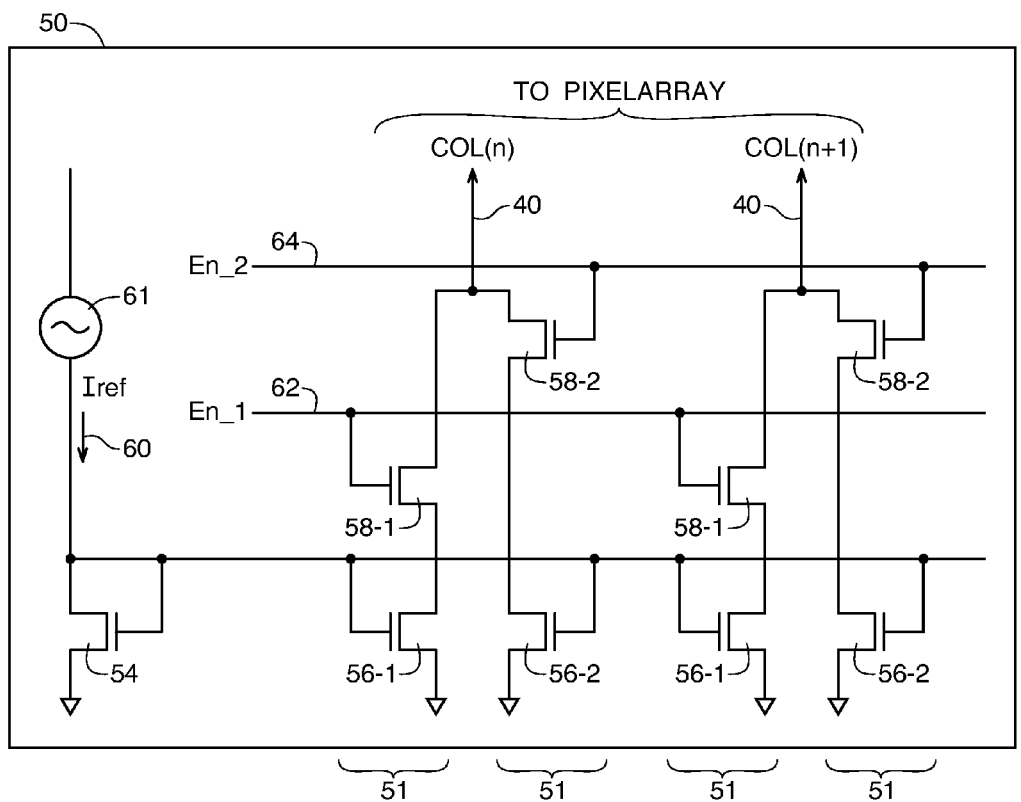
FIG. 4 is a diagram of illustrative column current supply circuitry having redundant column current mirror circuitry in accordance with an embodiment of the present invention.

As shown in FIG. 4, column bias circuitry 50 may include a plurality of parallel current supply circuits 51 such as parallel portions of current mirror circuits on each column line associated with each pixel column. For example, bias circuitry 50 may be implemented as a set of current mirror circuits for each pixel column in which current that flows through one or more mirror transistors on each column line 40 is configured to mirror a current that flows through an additional transistor that is coupled to the mirror transistors on multiple column lines. In configurations in which column bias circuitry 50 is implemented as a current mirror circuit, each column of pixels (pixel column) may include an active current supply circuit 51 and an inactive current supply circuit 51 on each pixel column (e.g., each column of pixels may include an active and an inactive mirror transistor coupled to additional transistor 54). Multiple mirror transistors 56 on a common column line 40 may be coupled in parallel between pixel array 200 and a ground voltage terminal (e.g., a ground plane or ground mesh in image sensor 16).

In the example of FIG. 4, each column line 40 includes two mirror transistors 56 (i.e., transistors 56-1 and 56-2) coupled to transistor 54. A first column line coupled to a $n^{th}$ pixel column (labeled, e.g., Col(n)) may include a first mirror transistor 56-1 and a second mirror transistor 56-2 coupled between pixel column Col(n) and a ground voltage terminal. A second column line coupled to an $(n+1)^{th}$ pixel column (labeled, e.g., Col(n+1)) may also include a first mirror transistor 56-1 and a second mirror transistor 56-2 coupled between pixel column Col(n+1) and the ground voltage terminal.

Transistor 54 may include a first source/drain terminal coupled to a current source 61 and a second source/drain terminal coupled to a ground voltage (e.g., the second source/drain terminal of transistor 54 may be coupled to a ground plane in image sensor 16). Transistor 54 may be configured to receive a current Iref (as indicated by arrow 60) from current source 61. The first source/drain terminal of transistor 54 (e.g., the terminal that receives current Iref) may be coupled to a gate terminal of transistor 54.

Each mirror transistor 56 may have a first source/drain terminal and a gate terminal that are coupled together and coupled to the first source/drain terminal and the gate terminal of transistor 54. In this way, mirror transistors 56 on each column line may be configured so that current Iref that flows through transistor 54 may be mirrored through mirror transistors 56 and provided to pixels 190 of pixel array 200.

Each mirror transistor 56 on each column line 40 may be coupled in series with an enabling transistor 58 associated with that mirror transistor. For example, each mirror transistor 56-1 on each column line 40 may have an associated enabling transistor 58-1 on that column line. Each mirror transistor 56-2 on each column line (e.g., formed in parallel with mirror transistor 56-1 on that column line) may be coupled in series with an enabling transistor 58-2 on that column line. Enabling transistors 58-1 may be coupled between a pixel column in pixel array 200 and an associated mirror transistor 56-1. Similarly, enabling transistors 58-2 may be coupled between a pixel column in pixel array 200 and an associated mirror transistor 56-2.

Each enabling transistor 58-1 may have a gate terminal and a first source/drain terminal coupled to an associated a column line 40 and a signal line such as signal line 62. Each enabling transistor 58-2 may have a gate terminal and a first source/drain terminal coupled to an associated column line 40 and a signal line such as signal line 64. Mirror transistors 56-1 may be activated by providing asserting an enable/disable signal En_1 high to provide an enable signal to enabling transistors 58-1 along signal line 62 (turning on enabling transistors 58-1). Mirror transistors 56-2 may be activated by asserting an enable/disable signal En_2 high to provide an enable signal to enabling transistors 58-2 along signal line 64 (thereby turning on enabling transistors 58-2).

During operation of image sensor 16, signal En_1 may be permanently or occasionally set high while signal En_2 is permanently set low, signal En_2 may be permanently or occasionally set high while signal En_1 is permanently set low, or both signal En_1 and signal En_2 may be permanently or occasionally set high. Programmable memory such as OTPM 203 (FIG. 2) may be programmed during manufacturing of device 10 to permanently set either one of signal En_1 or signal En_2 low based on pixel array performance during pixel array tests resulting in an active current supply circuit 51 and an inactive current supply circuit 51 on each column line 40. During operation of image sensor 16 the enable/disable signal associated with the active current supply circuit (e.g., En_1 or En_2) may be constantly held high or may be occasionally pulsed (e.g., while pulsing a row select signal RS).

The example of FIG. 4 in which each column line 40 includes two current supply circuits 51, each including a mirror transistor and an associated enabling transistor coupled to a signal line is merely illustrative. If desired, each column line 40 may be provided with one currently supply circuit, three currently supply circuits, four currently supply circuits or more than four currently supply circuits. Each mirror transistor on each column line may have an associated enabling transistor for coupling that mirror transistor to a pixel column.

The configuration of current mirror circuits on column lines 40 of FIG. 4 is merely illustrative. If desired, each column line 40 may include multiple parallel current mirror circuits of any type (e.g., metal-oxide-semiconductor field-effect transistor current mirror circuits, feedback assisted current mirror circuits such as gain-boosted current mirror circuits or other suitable current mirror circuits). Providing column lines 40 with multiple sets of current supply circuitry may help reduce the likelihood of unwanted noise in image data generated using that column line by providing redundancy for the image sensor in the case that some current supply circuitry is noisy.

Figure 5:
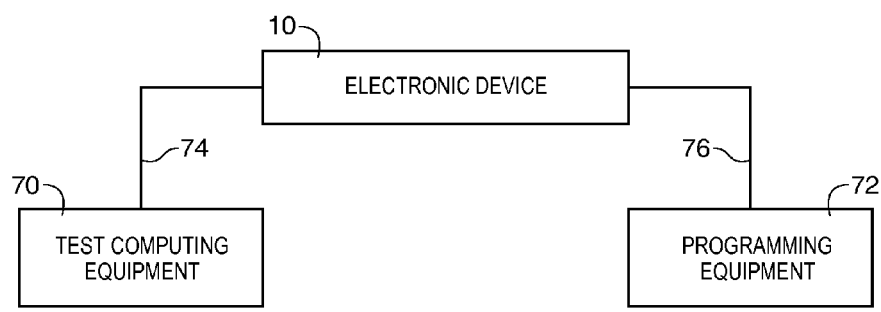
FIG. 5 is a diagram of an illustrative test system for testing devices of the type shown in FIG. 1 in accordance with an embodiment of the present invention.

During manufacturing of an electronic device such as device 10 (FIG. 1) having an image sensor with a set of parallel current supply circuitry of the type shown in FIG. 4, each image sensor may undergo testing to determine which current supply circuit (e.g., which mirror transistor) on each column are to be used during operation of that image sensor. Illustrative equipment for testing electronic devices such as device 10 is shown in FIG. 5. As shown in FIG. 5, during testing operations, device 10 may be coupled to testing equipment 70 and/or programming equipment 72.

Test computing equipment 70 may include computers, microprocessors, storage such as volatile and non-volatile memory, displays, keyboards, touch-screens, or other equipment for gathering and processing image sensor performance data. Testing equipment 70 may be coupled to device 10 using a wireless or wired communications path such as path 74.

Programming equipment 72 may include computers, microprocessors, storage such as volatile and non-volatile memory, displays, keyboards, touch-screens, or other equipment for configuring bias control circuitry such as bias control circuitry 50 of image sensor 16. Programming equipment 72 may be coupled to device 10 using a wireless or wired communications path such as path 76. Test equipment 70 and programming equipment 72 may be separate sets of computing equipment or may be formed as a common computing package capable of testing and programming device 10.

During testing of device 10, pixel array 200 of each image sensor 16 of device 10 may be operated using a first current supply circuit (e.g., a first mirror transistor) on each column line of the image pixel array (e.g., using mirror transistors 56-1 by setting enable signal En_1 high while enable signal En_2 is set low). While enable signal En_1 is set high and signal En_2 is set low, pixel array performance data may be gathered by gathering image data using pixels 190 of pixel array 200. Test computing equipment 70 may gather and process the pixel array performance data to determine whether any pixel column exhibits poor column performance. Poor column performance may be identified by identifying a tri-modal noise distribution in pixel performance data that indicates possible random telegraph signal (RTS) in the pixel performance data (as an example).

If no pixels column in pixel array 200 are determined to exhibit poor column performance, programming equipment 72 may configure bias circuitry 50 by, for example, programming OTPM 203 to permanently activate the first current supply circuit (e.g., transistors 56-1 and 58-1) and/or permanently deactivate a second current supply circuit (e.g., transistors 56-2 and 58-2) on each column and testing operations may be terminated for that pixel array.

If any pixel column in pixel array 200 is determined to exhibit poor column performance, additional pixel array performance data may be gathered while the first set of current supply circuits on the pixel columns are inactive (e.g., transistors 58-1 on column lines 40 are turned off) a second set of current supply circuits on the pixel columns (e.g., mirror transistors 56-2) are active. However, this is merely illustrative. If desired, selected mirror transistors 56-1 on column lines 40 may be activated and a selected second set of mirror transistors such as selected mirror transistors 56-2 on the pixel column lines may be activated, mirror transistors 56-2 may be activated while leaving mirror transistors 56-1 activated.

Figure 6:
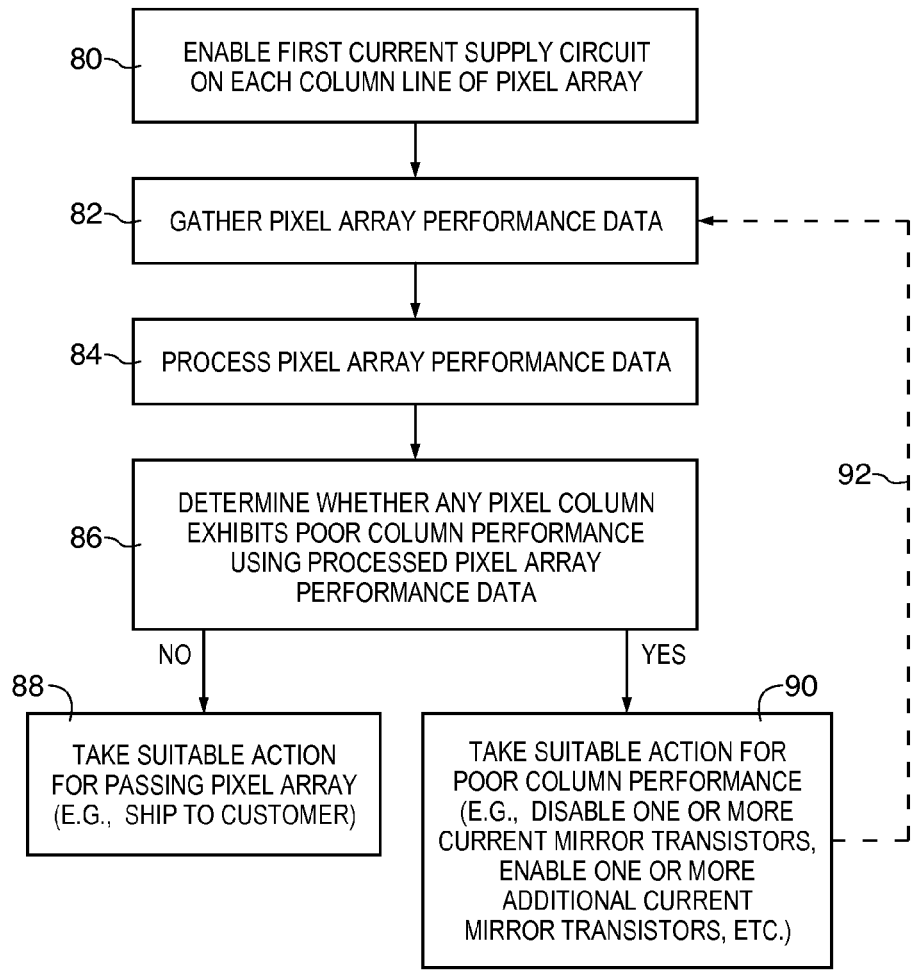
FIG. 6 is a flow chart of illustrative steps that may be used in configuring image sensors with image pixel arrays having redundant column current mirror circuitry in accordance with an embodiment of the present invention.

Illustrative steps that may be used in testing devices such as device 10 having an image sensor with a set of parallel current supply circuits are shown in FIG. 6.

At step 80, a first current transistor on each column line of a pixel array may be activated (e.g., by setting enable signal En_1 high while enable signal En_2 is set low).

At step 82, while enable signal En_1 is set high and signal En_2 is set low, pixel array performance data may be gathered (e.g., by gathering image data using pixels 190 of pixel array 200).

At step 84, test equipment such as test computing equipment 70 may be used to process the pixel array performance data.

At step 86, test equipment 70 may be used to determine whether any pixel column exhibits poor column performance using the processed pixel array performance data. Poor column performance may be identified by identifying a tri-modal noise distribution in the processed pixel performance data that indicates possible random telegraph signal (RTS) in the pixel performance data (as an example).

If no pixels column in pixel array 200 is determined to exhibit poor column performance, testing operations may proceed to step 88.

At step 88 suitable action may be taken for a passing pixel array. Suitable action for a passing pixel array may include permanently enabling transistors 58-1 (e.g., by programming OTPM 203), permanently disabling transistors 58-2 (e.g., by programming OTPM 203), terminating testing operations for that pixel array, testing additional pixel arrays in that image sensor, testing additional image sensors in that device, passing the device under test on to an additional testing or calibration station, or shipping the device to a consumer.

If any pixel column in pixel array 200 is determined to exhibit poor column performance, testing operations may proceed to step 90.

At step 90, suitable action may be taken for a pixel array exhibiting poor column performance. Suitable action for a pixel array exhibiting poor column performance may include using test computing equipment 70 or programming equipment 72 to temporarily disable transistors 58-1 on column lines 40 and temporarily enable a second set of transistors such as transistors 58-2 on the pixel column lines, to disable selected 58-1 on column lines 40 and enable a selected second set of mirror transistors such as selected transistors 58-2 on the pixel column lines, or to enable a second set of transistors such as transistors 58-2 on the pixel column lines while leaving transistors 58-1 enabled.

If desired, steps 82, 84, and 86 may be repeated with transistors 58-2 enabled and transistors 58-1 disabled as indicated by dashed line 92. For example, additional pixel array performance data may be gathered with transistors 58-2 enabled and transistors 58-1 disabled and test computing equipment 70 may determine, using the additional pixel array performance data whether any pixel column exhibits poor column performance with transistors 58-2 enabled and transistors 58-1 disabled. If it is determined during step 86 that no pixel columns in pixel array 200 exhibit poor column performance, testing operations may again proceed to step 88.

At step 88, in response to determining that no pixels column in pixel array 200 exhibit poor column performance with transistors 58-2 enabled and transistors 58-1 disabled, programming equipment 72 may be used, for example, to permanently activate transistors 56-2 and permanently inactivate transistors 56-1 (e.g., by programming OTPM 203 of FIG. 2 to permanently enable transistors 58-2 and permanently disable transistors 58-1).

Various embodiments have been described illustrating image sensors having one or more image pixel arrays each with image pixels arranged in pixel rows and pixel columns. Each pixel column of an image pixel array may be coupled to biasing circuitry for providing a bias current to the image pixels of that pixel column over an associated conductive column line. The biasing circuitry coupled to each pixel column over the corresponding column line may include two or more current supply circuits such as redundant current supply circuits on each column line.

Each current supply circuit on each column line may include a portion of a current mirror circuit. Current supply circuits on each column line may be coupled to additional circuitry such as a common additional portion of the current mirror circuit. Current supply circuits on some or all of the pixel columns may be coupled to the common additional portion of the current mirror circuit. The common additional portion of the current mirror circuit may include a current source and an input transistor. Each current supply circuit may include a mirror transistor for mirroring current that flows through the input transistor and an enabling transistor for activating that mirror transistor. The mirrored current that flows through a particular mirror transistor may be supplied to source follower transistors of the image pixels along the column line associated with that particular mirror transistor.

The current supply circuits on each column line (associated with each pixel column) may include an active current supply circuit and an inactive current supply circuit. The active current supply circuit on each column line may form, in combination with the current source and the input transistor, a current mirror circuit.

During manufacturing of image sensors having redundant current supply circuits on column lines associated with columns of image pixels, the image sensors may undergo testing. During testing operations, a first current supply circuit such as a first portion of a current mirror circuit on each pixel column may be activated. Activating the first current supply circuits may include supplying an enable signal to an enabling transistor in the first portions of the current mirror circuits. Test computing equipment may be used to gather pixel array performance data while the first current supply circuits on each column are active. If it is determined that no pixel column in the pixel array exhibits poor column performance, one-time programmable memory on the image sensor may be programmed to permanently activate the first current supply circuits and to permanently disable a set of second current supply circuits.

If it is determined that any pixel column in the pixel array exhibits poor column performance, programming equipment may be used to temporarily inactivate (disable) the first current supply circuit on each column and activate a second current supply circuit on each column. If desired, additional pixel array performance data may be gathered and processed using the test computing equipment while the second current supply circuits on the pixel columns are active. In response to determining that no pixel column exhibits poor pixel column performance using the additional pixel array performance data, one-time programmable memory on the image sensor may be programmed to permanently activate the second current supply circuits and to permanently inactivate the first current supply circuits.

The foregoing is merely illustrative of the principles of this invention which can be practiced in other embodiments.

What is claimed is:

1. An image sensor, comprising:
   an array of image pixels arranged in pixel rows and pixel columns;
   a plurality of active current supply circuits; and
   a plurality of inactive current supply circuits, wherein at least one of the plurality of inactive current supply circuits and a corresponding one of the active current supply circuits are coupled to an associated one of the pixel columns, wherein the at least one of the plurality of inactive current supply circuits and the corresponding one of the active current supply circuits are coupled in parallel to the associated one of the pixel columns, wherein each image pixel in each pixel column comprises:
   a photosensitive element; and
   a source follower transistor having a gate terminal coupled to the photosensitive element, wherein the source follower transistors of the image pixels in each pixel column are configured to receive a bias current from the active current supply circuit that is coupled to that pixel column, wherein, in combination with additional circuitry on the image sensor, each of the active current supply circuits forms a corresponding current mirror circuit for providing the bias current, and wherein the current mirror circuit corresponding to each of the active current supply circuits comprises a feedback-assisted current mirror circuit.

2. The image sensor defined in claim 1 wherein the current mirror circuit corresponding to each of the active current supply circuits comprises a metal-oxide-semiconductor field-effect transistor current mirror circuit.

3. An image sensor, comprising:
an array of image pixels arranged in pixel rows and pixel columns;
a plurality of active current supply circuits; and
a plurality of inactive current supply circuits, wherein at least one of the plurality of inactive current supply circuits and a corresponding one of the active current supply circuits are coupled to an associated one of the pixel columns, wherein the at least one of the plurality of inactive current supply circuits and the corresponding one of the active current supply circuits are coupled in parallel to the associated one of the pixel columns, wherein each image pixel in each pixel column comprises:
a photosensitive element; and
a source follower transistor having a gate terminal coupled to the photosensitive element, wherein the source follower transistors of the image pixels in each pixel column are configured to receive a bias current from the active current supply circuit that is coupled to that pixel column, wherein, in combination with additional circuitry on the image sensor, each of the active current supply circuits forms a corresponding current mirror circuit for providing the bias current, wherein the additional circuitry comprises:
a current source; and
an input transistor coupled between the current source and the plurality of active current supply circuits.

4. The image sensor defined in claim 3 wherein each active current supply circuit comprises:
a mirror transistor having a gate terminal and a source/drain terminal, wherein the gate terminal is coupled to the source/drain terminal; and
an enabling transistor coupled to the mirror transistor, wherein the enabling transistor is configured to receive an enable signal that activates that active current supply circuit.

5. The image sensor defined in claim 4 wherein the input transistor comprises:
a gate terminal; and
a source/drain terminal coupled to the gate terminal, wherein the gate terminal of the input transistor is coupled to the gate terminal the mirror transistor of each active current supply circuit.

6. The image sensor defined in claim 5 wherein each inactive current supply circuit comprises:
a mirror transistor having a gate terminal and a source/drain terminal, wherein the gate terminal is coupled to the source/drain terminal; and
an enabling transistor coupled to the mirror transistor, wherein the enabling transistor is configured to inactivate that inactive current supply circuit.

7. The image sensor defined in claim 6 further comprising:
a plurality of conductive column lines, wherein each conductive column line in the plurality of conductive column lines is coupled to a respective pixel column; and
readout circuitry coupled to the conductive column lines for reading out image signals from the image pixels along the conductive column lines.

* * * * *